(12) United States Patent
Klausner et al.

(10) Patent No.: US 10,439,257 B2
(45) Date of Patent: Oct. 8, 2019

(54) ENERGY STORAGE DEVICE, SYSTEM HAVING AN ENERGY STORAGE DEVICE, AND METHOD FOR OPERATING AN ENERGY STORAGE DEVICE

(75) Inventors: Markus Klausner, Leonberg-Hoefingen (DE); Volkmar Denner, Pfullingen (DE); Stefan Butzmann, Beilstein (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1033 days.

(21) Appl. No.: 14/234,752

(22) PCT Filed: Jun. 1, 2012

(86) PCT No.: PCT/EP2012/060382
§ 371 (c)(1),
(2), (4) Date: Apr. 24, 2014

(87) PCT Pub. No.: WO2013/013869
PCT Pub. Date: Jan. 31, 2013

(65) Prior Publication Data
US 2015/0147595 A1 May 28, 2015

(30) Foreign Application Priority Data
Jul. 27, 2011 (DE) .......................... 10 2011 079 874

(51) Int. Cl.
*H01M 10/48* (2006.01)
*H01M 10/42* (2006.01)
*H02P 27/06* (2006.01)

(52) U.S. Cl.
CPC ....... *H01M 10/482* (2013.01); *H01M 10/425* (2013.01); *H02P 27/06* (2013.01); *H01M 2220/10* (2013.01)

(58) Field of Classification Search
CPC ............. H01M 10/482; H01M 10/425; H01M 2220/10; H02P 27/06
See application file for complete search history.

(56) References Cited

U.S. PATENT DOCUMENTS 5,543,245 A * 8/1996 Andrieu ............. G01R 31/3679
320/124
5,744,936 A * 4/1998 Kawakami ........ H01M 10/4207
320/120

(Continued)

FOREIGN PATENT DOCUMENTS

JP 2010-239711 A 10/2010
WO 2010/116671 A1 10/2010

OTHER PUBLICATIONS

International Search Report corresponding to PCT Application No. PCT/EP2012/060382, dated Oct. 10, 2012 (German and English language document) (5 pages).

*Primary Examiner* — Gregg Cantelmo
(74) *Attorney, Agent, or Firm* — Maginot, Moore & Beck LLP

(57) ABSTRACT

An energy storage device for generating an n-phase supply voltage includes a plurality of energy supply branches that are connected in parallel, each of which is connected to an output connector of the energy storage device. Each of the energy supply branches includes a plurality of energy storage modules that are connected in series, each having at least one energy storage cell, and having a plurality of coupling modules connected to one of the plurality of energy storage modules, respectively, each configured to couple, or to bridge, the connected energy storage module with the energy supply branch. The energy storage device further includes a control system.

7 Claims, 1 Drawing Sheet

(56) References Cited

U.S. PATENT DOCUMENTS

| | | | |
|---|---|---|---|
| 5,960,898 A | 10/1999 | Okada et al. | |
| 2005/0007074 A1* | 1/2005 | Koster | G01R 31/3637 |
| | | | 320/135 |
| 2012/0013180 A1 | 1/2012 | Muto et al. | |

* cited by examiner

# ENERGY STORAGE DEVICE, SYSTEM HAVING AN ENERGY STORAGE DEVICE, AND METHOD FOR OPERATING AN ENERGY STORAGE DEVICE This application is a 35 U.S.C. § 371 National Stage Application of PCT/EP2012/060382, filed on Jun. 1, 2012, which claims the benefit of priority to Serial No. DE 10 2011 079 874.9, filed on Jul. 27, 2011 in Germany, the disclosures of which are incorporated herein by reference in their entirety.

The disclosure relates to an energy storage device, a system having an energy storage device, and a method for operating an energy storage device.

BACKGROUND

It is becoming apparent that electronic systems that combine new energy storage technologies with electric drive technology will be ever more widely used in future both in stationary applications, such as for example wind energy plants or solar energy systems, also in vehicles, such as hybrid vehicles or electric vehicles. Nowadays, electric machines are being driven by way of example by means of a combination of battery cells in strings, wherein a downstream AC converter provides the supply voltage to the electric machine.

By way of example, a DC voltage that is provided by a DC voltage intermediate circuit is converted into a three phase AC voltage as alternating current is supplied to the supply connectors of a three phase electric machine or of a three phase supply network by way of a converter in the form of an AC pulse converter. The DC voltage intermediate circuit is for its part supplied by a string of battery cells. In order to be able to fulfill the pre-existing requirements relating to power and energy for a specific application, several battery cells are connected in series.

In the case of methods of this type, it is desirable to connect individual battery cells selectively into the supply circuit in order either to gain the advantages of the system in the downstream electronic power output stage or to purposefully remove from the supply circuit individual battery cells that as a result of aging or the tasks involved over time no longer provide the required power. Battery cells age as a result of the amount of their energy output and/or power output, the operating temperature and other parameters. Fluctuations in performance as a result of manufacturing tolerances or fluctuating environmental conditions of the individual battery cells cause some battery cells to age more quickly than other battery cells. In the case of a plurality of battery cells that are connected, the differing aging conditions can cause a load imbalance between the individual battery cells, as a result of which the weakest battery cells determine the overall performance of the supply circuit. The method known from the prior art of balancing said battery cells on the basis of the cell voltage does not differentiate between whether a load imbalance has been caused by extremely high power consumptions over short periods of time or by low power consumptions over longer periods of time.

SUMMARY

The present disclosure provides in accordance with an embodiment an energy storage device for generating an n-phase supply voltage, wherein n≥1, having a plurality of parallel connected energy supply strings that are connected in each case to an output connector of the energy storage device, wherein the energy supply strings comprise in each case a plurality of energy storage modules that can be series connected and that comprise in each case at least one energy storage cell, and having a plurality of coupling modules that are connected in each case to one of the plurality of energy storage modules, which coupling modules are designed in each case so as to couple the respective connected energy storage module into the energy supply string or to bridge said energy storage module, and having a control device that is connected to the coupling modules and that is designed so as to control each of the coupling modules in dependence upon a value of the aging functions of each of the energy storage modules for the purpose of coupling the respective connected energy storage module into one of the plurality of energy supply strings.

In accordance with a further embodiment, the present disclosure provides a method for operating an energy storage device in accordance with the disclosure, said method having the steps:

determining operating parameters of each of the energy storage modules, calculating values in each case of an aging function for each of the energy storage modules on the basis of the determined operating parameters, determining a prevailing load requirement of the energy storage device, and, in dependence upon the prevailing load requirement, selecting a group of energy storage modules that are used to generate the n-phase supply voltage on the basis of the calculated values of the aging functions of all energy storage modules.

In an advantageous embodiment, the aging function for each of the energy storage modules is represented as a damage accumulation function that is increasing in a monotonic manner, wherein each change in an operating parameter that determines the extent of the aging process causes the value of the aging function to increase.

The present disclosure provides, in accordance with a further embodiment, a system having a q-phase electric machine, wherein q≥1, having an AC converter that is connected to the electric machine and that is designed so as to generate a q-phase AC voltage for operating the electric machine, and having an energy storage device in accordance with the disclosure that is connected to the AC converter and is designed so as to generate a supply voltage for the AC converter.

One idea of the present disclosure is to connect energy storage modules selectively into different energy supply strings of an energy storage device in order to generate a DC voltage at the output connectors of the energy storage device. The individual cell aging condition of the energy storage cells that are allocated to the respective energy storage modules determines how the energy storage modules are selectively connected. The cell aging condition of each energy storage cell arises from a cell-specific aging function that is dependent upon operating parameters of the energy storage cell, so that the total connection condition can be optimized over all energy storage modules with regard to a cumulative cell aging condition of the connected individual energy storage cells. In contrast to the known balancing functions, the cumulative aging function can represent the differing influence of different operating parameters, including operating time and service life, on the aging process and as a consequence it is possible to optimize the operating life of the energy storage device.

A further idea of the present disclosure is to provide hierarchical control circuits for selectively connecting energy storage modules in an energy storage device having a plurality of parallel connected energy supply strings that comprise a series connection of a plurality of energy storage modules. In a first hierarchical step, a cumulative cell aging condition of the connected individual energy storage cells of an energy supply string is optimized. In a second hierarchical step, the cumulative cell aging condition of the connected energy supply strings is optimized in a superior manner.

One advantage of the disclosure resides in the fact that by virtue of optimizing the connection states of the energy storage modules, the operating life, the performance and also the availability of the entire energy storage device is increased. This is particularly the case in configurations in which the energy storage device must generate a supply voltage for a consumer that has a load that varies greatly over a period of time.

A further advantage of the disclosure resides in the fact that not only is the prevailing condition of the energy storage cells taken into consideration when optimizing the connection states but that in particular the individual load history of the individual energy storage cells is also taken into consideration. As a consequence, the connection strategy can be tailored dynamically to suit the changed operating conditions of the energy storage device.

The connection strategies in accordance with the disclosure can be implemented in an advantageous manner in each operating mode of the energy storage device. By way of example, the connection states of the energy storage cells that contribute to a discharge voltage of the energy storage device can be optimized during a discharging operation of the energy storage device. Alternatively, the connection states of the energy storage cells of the energy storage device, which energy storage cells are influenced by a charging voltage, can be optimized during a charging operation of the energy storage device. A discharging/charging operation, in other words discharging the first energy storage cells for the purpose of charging the second energy storage cells of the energy storage device, can also be implemented by taking into consideration the connection strategies in accordance with the disclosure.

The respective aging function of an energy storage module can depend preferably on the progression with respect to time of the operating temperature, the progression with respect to time of the power output, the progression with respect to time of the energy output and/or on the cumulative operating time. This provides the advantage that the operating parameters that are relevant for the aging of an energy storage module and/or the associated energy storage cells can be included in the calculation of the aging function in order to be able to determine precisely the aging history of each energy storage module.

In an advantageous embodiment, the control device can be designed so as to update the value of the aging functions of each energy storage module at predetermined time intervals in dependence upon the progression with respect to time of the operating temperature, the progression with respect to time of the power output, the progression with respect to time of the energy output, the cumulative service life without energy consumption and/or the cumulative operating time of the respective energy storage module. Consequently, it is possible in an advantageous manner to tailor dynamically the connection strategy to suit the prevailing condition. In addition, it is thus possible to save on storage capacity and computing capacity since the aging history can already be taken into consideration implicitly by means of iteratively updating the aging functions.

It is preferred that the control device comprises a cell balancing device that is designed so as to select a predetermined number of coupling modules in each one of the energy supply strings for the purpose of coupling the energy storage modules that are allocated in each case to the selected coupling modules into the energy supply strings in such a manner that the difference is minimal between the totals of the values of the aging functions of the energy storage modules of the energy supply string, which energy storage modules are allocated in each case to the selected coupling modules. It is possible in this manner to achieve a string-specific balancing of the connection strategy for the energy storage modules of the energy supply string in accordance with the first hierarchical step.

Furthermore, it is possible in accordance with an advantageous embodiment that each of the energy supply strings furthermore comprises a string coupling module that is coupled in each case between the coupling modules and the output connector, and the control device can comprise a string balancing device that is designed so as to select a predetermined number of string coupling modules for the purpose of coupling the energy storage modules of the energy supply strings that are allocated in each case to the selected string coupling modules to the output connector in such a manner that the total of the values of all aging functions of the energy storage modules of the energy supply strings that are allocated in each case to the selected string coupling modules is minimal. This renders it possible in an advantageous manner to achieve a load-dependent selection of energy supply strings whose energy storage modules have aged the least, so that it is possible to balance the aging condition across the strings in accordance with the second hierarchical step.

Further features and advantages of embodiments of the disclosure are evident from the description hereinunder with reference to the attached drawings.

DETAILED DESCRIPTION

Figure 1:
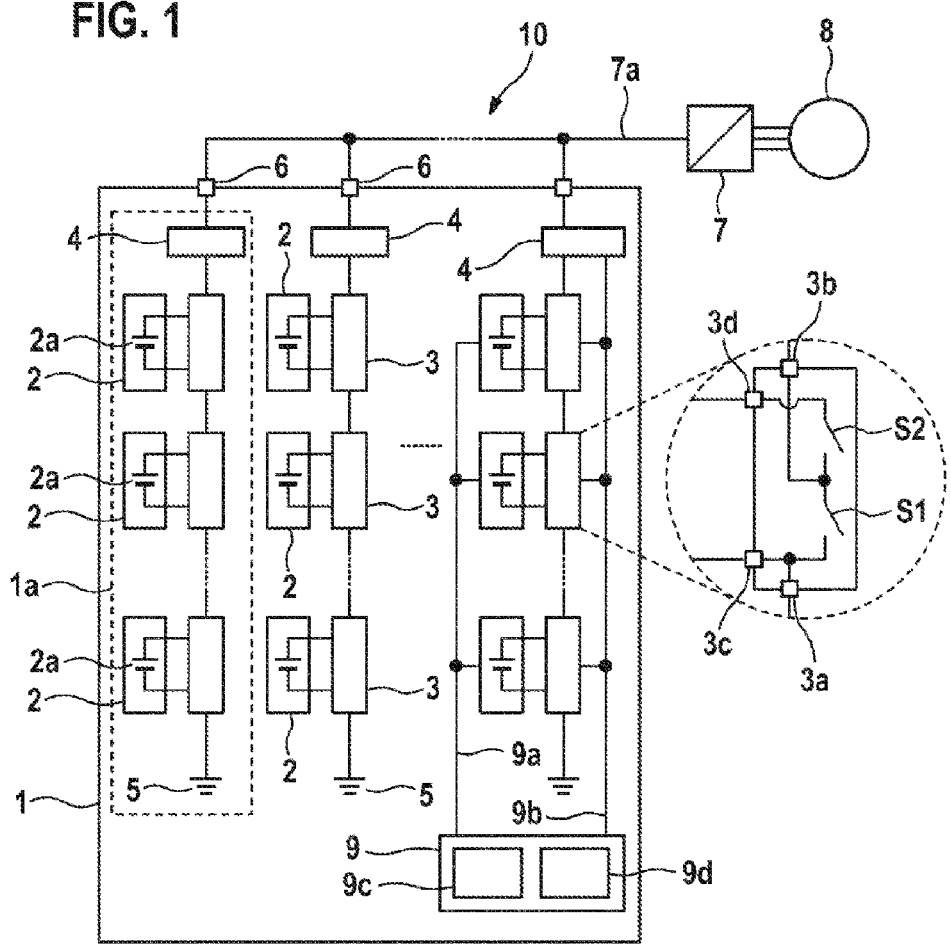
FIG. 1 illustrates a schematic diagram of a system having an energy storage device in accordance with an embodiment of the present disclosure.

FIG. 1 illustrates a schematic diagram of a system 10 having an energy storage device 1. The energy storage device 1 comprises a plurality of parallel connected energy supply strings 1a. By way of example, FIG. 1 illustrates three energy supply strings 1a, wherein, however, any other number of energy supply strings 1a can likewise be possible. For reasons of clarity, only the left hand energy supply string 1a is illustrated as an example.

Each of the energy supply strings 1a is connected to an allocated output connector 6, which are connected in each case to a supply voltage line 7a of an AC converter 7. In this case, it is possible to generate a string voltage at each of the output connectors 6 from the respective connected energy supply string 1a. The AC converter 7 can convert the supply voltage that is provided by the energy storage device 1 on the supply voltage line 7a into a q-phase AC voltage that can then be supplied to a q-phase electric machine 8.

Alternatively, it can also be possible that each of the output connectors 6 is connected to a separate supply voltage line 7a. In this case, it is possible to generate a part phase voltage of an n-phase supply voltage of the energy storage device 1 at each of the output connectors 6 from the respective connected energy supply string 1a, which part phase voltage can then be supplied without the use of an AC converter 7 directly to the phase connectors of the q-phase electric machine 8, wherein in the special case n=q is possible. In the alternative embodiment, the energy storage device 1 can fulfill an integrated AC pulse converter function.

It is also possible by way of example to supply in place of the electric machine 8 a different electric load, such as by way of example an electrical energy network, with the supply voltage of the energy storage device 1. The number q of the phases of the electrical machine 8 is only illustrated in FIG. 1 by way of example with three phases; any other number of phases greater than one is likewise possible.

The energy supply strings 1a are connected at their ends to a reference potential 5. The reference potential 5 can be by way of example in each case a ground potential.

The energy storage device 1 comprises a plurality of coupling modules 3 that are connected in series into the energy supply strings 1a. FIG. 1 illustrates by way of example three coupling modules 3 for each energy supply string, wherein any other number of coupling modules 3 is likewise possible. An energy storage module 2 is allocated to each of the coupling modules 3. The respective energy storage modules 2 are connected in each case by way of two supply connectors 3c, 3d to the allocated coupling module 3. The number of the energy storage modules 2 is correlated to the number of the coupling modules 3.

The detailed cut-out section on the right hand side of the drawing in FIG. 1 illustrates an exemplary structure for a coupling module 3, which is explained in more detail hereinunder. The other coupling modules 3 in FIG. 1 can be constructed in a similar manner. For reasons of clarity, FIG. 1 illustrates in detail only the arrangement of the components in one of the coupling modules 3.

The coupling module 3 comprises a first coupling device S1 and a second coupling device S2. The first and the second coupling devices S1 and S2 respectively can be achieved by way of example in each case by way of two semiconductor switches and/or transistor switches. The first and the second coupling devices S1 and S2 respectively can be formed by way of example by means of controllable switching elements. The switching elements can be embodied for example as power semiconductor switches, e.g. in the form of IGBTs (insulated gate bipolar transistors) or as MOSFETs (metal oxide semiconductor field-effect transistors). The layout of the first and the second coupling devices S1 and S2 respectively with regard to the current carrying capacity can be tailored to suit the allocated energy storage modules 2. The coupling devices S1 and S2 produce in FIG. 1 by way of example a half-bridge circuit. If the first coupling device S1 is closed and the second coupling device S2 is open, the energy storage module 2 that is coupled to the supply connectors 3c, 3d is bridged, so that the input connectors 3a and 3b of the coupling module 3 are directly connected to one another. Conversely, the energy storage module 2 is coupled by way of the supply connectors 3c, 3d into the respective energy supply string 1a if the first coupling device S1 is open and the second coupling device S2 is closed.

It should be clear to a person skilled in the art that additional coupling devices can be arranged in the coupling module 3 in order to achieve by way of example a full-bridge circuit of the coupling module 3. In this case, the polarity of the energy storage module 2 can be changed between the input connectors 3a and 3b of the coupling module 3. The additional coupling devices can be similar to the first and the second coupling devices S1 and S2 respectively.

The energy storage modules 2 comprise in each case at least one energy storage cell 2a, by way of example a battery cell or a different energy storage device, which is arranged in such a manner that a supply voltage of the energy storage cells 2a is available at the supply connectors 3c, 3d. It can also be provided that several energy storage cells 2a are connected in series between the two supply connectors 3c, 3d. It is possible for each of the energy storage modules 2 to comprise an identical arrangement of the energy storage cells 2a.

It is therefore possible by means of correspondingly controlling the coupling devices S1 and S2 respectively of the coupling modules 3 for the allocated energy storage module 2 to be selectively either connected into one of the energy supply strings 1a or bridged. It is possible to provide for this purpose that the first and the second coupling devices S1 and S2 respectively are connected in each case in pairs.

The part voltages of the energy supply strings 1a are determined by the respective switching state of the first and the second coupling devices S1 and S2 respectively and can be adjusted in steps. The stepped adjustment is achieved in dependence upon the available individual voltages of the energy storage modules 2 and the number of said energy storage modules. In particular, the total of all individual voltages of the energy storage modules 2 in an energy supply string 1a can be greater in each case than the maximum part voltage that is to be provided at one of the output connectors 6 of the energy storage device 1. In this manner, in each case only a part of the energy storage modules 2 for each energy supply string 1a is sufficient in order to generate the part voltages at the output connectors 6. The other energy storage modules 2 can be bridged in each case by way of the coupling module 3.

Furthermore, the energy storage device 1 comprises a control device 9 that is connected to the coupling modules 3 by way of a control line 9b and that is designed so as to control the first and the second coupling devices S1 and S2 respectively by way of corresponding control signals. It is possible in this manner to control the first and the second coupling devices S1 and S2 respectively in a purposeful and coordinated manner by way of the control device 9 in order to adjust the output voltage of the energy storage device 1 at the output connectors 6 of the energy storage device 1 accordingly in a dynamic manner. Furthermore, the control device 9 is connected by way of a data acquisition line 9a to the energy storage modules 2 by means of which operating parameters of the energy storage modules 2 can be acquired. For reasons of clarity, FIG. 1 illustrates in each case only one control line 9b and one data acquisition line 9a, however it is clear that the energy storage modules 2 and the coupling modules 3 of the other energy supply strings 1a are connected in a corresponding manner by way of control lines and data acquisition lines to the control device 9.

Figure 2:
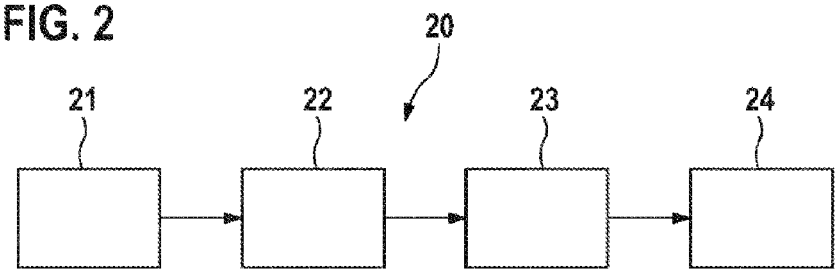
FIG. 2 illustrates a schematic diagram of a method for operating an energy storage device in accordance with a further embodiment of the present disclosure.

As is illustrated hereinunder with regard to the method 20, illustrated schematically in FIG. 2, for operating the energy storage device 1 shown in FIG. 1, it is possible in this manner to select the energy storage modules 2 that are used for generating the part voltages at the output connectors 6.

The other energy storage modules 2 are not used to generate the part voltages at the output connectors 6. It is possible to change this selection during the operation of the energy storage device 1 so that the composition of the group of selected energy storage modules 2 is flexible. The selection depends in particular upon the individual aging of the energy storage modules 2.

For the purpose of describing the aging of the energy storage modules 2, an aging function D is calculated for each of the energy storage modules 2:

$$D_x = f(U(t), I(t), T(t), \ldots),$$

wherein x represents an index of the respective energy storage module, U(t) represents the progression with respect to time of the voltage of the output voltages U of the respective energy storage module, I(t) represents the progression with respect to time of the current magnitude of the output current magnitudes I of the respective energy storage module and T(t) represents the progression with respect to time of the operating temperature T of the respective energy storage module. The variables U(t), I(t) T(t), the operating time t itself and possibly other variables represent operating parameters B of the energy storage modules 2.

The operating parameters can be acquired in a first step 21 of the method. The control device 9 of the energy storage device 1 can acquire the operating parameters B for this purpose, by way of example by way of the data acquisition line 9a from the energy storage modules. It can also be provided that the operating parameters B can be determined in dependence upon the characteristic variables of the energy storage device 1 and control signals of the coupling modules 3 in the control device 9.

The functional correlation f(B) that determines the aging function D can be determined in advance for example by means of endurance testing whilst varying the operating parameters B. Alternatively, it is possible to perform a parameter identification method during the operation of the energy storage device 1 in the control device 9 in order to extrapolate the functional correlation.

The aging function D can be considered in each case as an accumulated damage function that is increasing in a monotonic manner, in other words each change in a variable leads to an increase in the aging function D. This also means in particular that a mere aging over a period of time without loading the energy storage module 2 for the purpose of generating a supply voltage leads to an increase in the value of the aging function D. By way of example, it is possible to determine a cumulative service life without energy consumption, which cumulative service life without energy consumption contributes to an increase in the value of the aging function D. Consideration is given to the fact that an energy storage module 2 ages even in the passive state, in other words outside the actual operation.

Furthermore, the aging function D does not correlate with the operating parameters, which are currently being observed, of the energy storage modules 2, such as by way of example the prevailing charge state of the energy storage modules. Whereas, by way of example, it is possible to reinstate the same charge state of an energy storage module 2 following a charging and discharging cycle, the value of the aging function D following a cycle of this type increases, since each charging and discharging process loads the energy storage module 2 and correspondingly ages the energy storage module 2.

In fact, it is possible in the above example by way of the change in the value of the aging function D to determine the type of the loading in a charging and discharging cycle of this type. The greater the change in the value of the aging function D, the more damaging for the operating life of the energy storage module is the special implementation of the charging and discharging cycle. In this manner, it is possible by way of the change of the value of the aging function D to determine the influence of different operating states on the energy storage modules 2. By way of example, the aging function D depends upon the progression with respect to time of the power output, in other words upon the current magnitude and upon the voltage per unit of time. The greater the current magnitude and/or the voltage, the greater the power output and the greater the damage caused to the energy storage module. The aging function D can also depend upon the progression with respect to time of the energy output, in other words upon the current magnitude and the voltage over time. The longer the high voltages and/or current magnitudes prevail at the energy storage modules, the greater the energy output and the greater the damage to the energy storage module. Furthermore, the aging function D can depend upon the operating temperature T of the energy storage module. If the energy storage module is operated in a preferential manner at operating temperatures that lie outside an optimum range, in other words if the operating temperature of an energy storage module is too hot or too cold over a long period of time, this can have a negative effect on the aging of the energy storage module. Finally, an energy storage module also ages in the idle state, so that the cumulative operating time also has a damaging effect on the energy storage module.

It is possible to calculate the respective aging functions D for each of the energy storage modules 2 in a step 22 in the control device 9. It can be provided that the values of the aging functions D are iteratively updated, in other words a change in the aging function D is calculated after the operating parameters have been acquired and the value of the change is summed with the previous value of the aging function D. In this manner, it is only necessary to store in each case one value of the aging function D for each energy storage module 2 in the control device 9. It is possible to update the values of the aging functions D at predetermined, in particular periodic, time intervals.

A prevailing load requirement and/or voltage requirement of the electric machine 8 can be determined in a third step 23 of the method 20. The prevailing load requirement and/or the prevailing voltage requirement provide the boundary conditions according to which a group of energy storage modules 2 of the energy storage device 1 can be selected in step 24 of the method. The selected group of energy storage modules 2 is then used in each case to generate part voltages at the output connectors 6 of the energy storage device 1, in that the control device 9 controls the respective allocated coupling modules 3 accordingly by way of the control lines 9b. The composition of the group of energy storage modules 2 can vary in each case in a flexible manner depending upon the extent to which the values of the aging functions of all energy storage modules 2 have changed since the last selection and in dependence upon the boundary conditions.

It is possible to select the energy storage modules 2 by way of example in two hierarchical steps. In a first hierarchical step, the selection of the energy storage modules 2 for each energy supply string 1a can be optimized in a so-called "cell wear balancing" process in dependence upon the extent of the aging. For this purpose, the control device 9 can comprise a cell balancing device 9c that is designed so as to select a predetermined number of coupling modules 3 in each one of the energy supply strings 1a for the purpose of coupling the energy storage modules 2 that are allocated in each case to the selected coupling modules into the energy supply string 1a in such a manner that the total of the values of the aging functions D of the energy storage modules 2 of the energy supply string 1a, which energy storage modules are allocated in each case to the selected coupling modules 3, is minimal.

The optimization function can be $$\min_{k} \left| M^{-1} \cdot \sum_{i=1}^{M} D_i - D_k \right|, k = 1, \cdots, M$$

wherein M in a first iteration step represents the number m of energy storage modules 2 in an energy supply string 1a. As a consequence, for example, the energy storage module $k_1$ that comprises the greatest value of the aging function $D_k$ can be selected and this energy storage module is not used to generate the part voltage at the output connector 6 of the respective energy supply string 1a. In an iterative manner, it is then possible to exclude other modules of the energy storage modules 2 from the selection process in that the optimization function is used afresh on the remaining M−1 energy storage modules:

$$\min_{k} \left| (M-1)^{-1} \cdot \sum_{i=1}^{M} D_i - D_k \right|, k = 1, \cdots, M-1 \wedge k \neq k_1$$

In dependence upon the boundary conditions, in other words, upon the determined prevailing voltage requirement in the energy supply string 1a that is being considered, this iteration process can then be continued until one group of energy storage modules 2 remains, which energy storage modules are used to generate the part voltage at the output connector of the energy supply string 1a that is being considered. This group of energy storage modules 2 comprises the energy storage modules that have currently aged the least and/or have currently experienced the least amount of damage and can consequently be further used for the purpose of balancing the wear between the energy storage modules 2.

In a second hierarchical step, it is possible using a so-called "string wear balancing" method to optimize the selection of entire energy supply strings 1a in dependence upon the extent of the aging. For this purpose, each of the energy supply strings 1a can comprise a string coupling module 4 that is coupled in each case between the coupling modules 3 and the output connector 6 and that can be controlled by the control device 9 in such a manner that a complete energy supply string 1a can be uncoupled from the output connector 6 or can be coupled to the output connector 6. The control device 9 can comprise a string balancing device 9d that is designed so as to select a predetermined number of string coupling modules 4 for the purpose of coupling the energy storage modules 2 of the energy supply strings 1a that are allocated in each case to the selected string coupling modules 4 to the output connector 6 in such a manner that a difference is minimal between the total of the values of all aging functions D of the energy storage modules 2 of the energy supply strings 1a that are allocated in each case to the selected string coupling modules 4 and the total of the values of all aging functions D of the energy storage modules 2 of the energy supply strings 1a that are allocated in each case to the non-selected string coupling modules 4.

The optimization function can be:

$$\min_{k,j} \left| \left( \sum_{i=1}^{m} D_i \right)_k - \left( \sum_{h=1}^{m} D_h \right)_j \right|, k = 1, \cdots, z \wedge j = 1, \cdots, z \wedge k \neq j$$

wherein m represents the number of energy storage modules 2 in an energy supply string 1a and z represents the number of all energy supply strings 1a. In other words, those energy supply strings 1a that comprise the lowest total of the values of the aging functions D of their allocated energy storage modules 2 are selected, or rather those energy supply strings 1a that comprise the greatest totals of the values of the aging functions D of their allocated energy storage modules 2 are not selected.

In dependence upon the boundary conditions, in other words on the determined prevailing power requirement, the number of the energy supply strings 1a that are selected in this manner can vary, so that the prevailing power requirement of the electric machine 8 can be fulfilled.

In the first hierarchical step, the output voltage of an energy supply string 1a can therefore vary as a result of the selection of a group of energy storage modules 2. In the second hierarchical step, the power that is provided by the energy storage device 1 can vary as a result of the selection of a group of energy supply strings 1a. By virtue of the hierarchical control circuits, the the cell wear balancing process can form the inner control circuit and the cell wear balancing process can form the outer control circuit.

The method 20 can be used in particular in all operating states of the energy storage device 1, by way of example in a charging operation, in a discharging operation and/or in a charging/discharging operation. In each of the operating modes of the energy storage device 1, the method can contribute in an advantageous manner to extending the operating life of the individual energy storage modules 2 and consequently to extending the operating life of the entire energy storage device 1.

The invention claimed is:

1. An energy storage device for generating a supply voltage, comprising:
an output connector;
a plurality of parallel connected energy supply strings that are connected in each case to the output connector, each energy supply string of the plurality of energy supply strings including:
a first string comprising a first plurality of energy storage modules connected in series and a first plurality of coupling modules, each energy storage module in the first plurality of energy storage modules including at least one energy cell and each coupling module including at least one switching device configured to connect a corresponding energy storage module in the first plurality of energy storage modules in series with the first string in a first mode and bridge the corresponding energy storage module to isolate the corresponding energy storage module from the first string in a second mode;
a second string connected in parallel with the first string, the second string comprising a second plurality of energy storage modules connected in series and a second plurality of coupling modules, each energy storage module in the second plurality of energy storage modules including at least one energy cell and each coupling module including at least one switching device configured to connect a corresponding energy storage module in the second plurality of energy storage modules in series with the second string in the first mode and bridge the corresponding energy storage module to isolate the corresponding energy storage module from the second string in the second mode; and a control device connected to the first plurality of coupling modules in the first string and the second plurality of coupling modules in the second string, the control device being configured to:

identify an age of each energy storage module in the first plurality of energy storage modules and the second plurality of storage modules with reference to an operating temperature, a progression with respect to time of a power output, a progression with respect to time of an energy output, a service life without energy consumption, and a cumulative operating time of each energy storage module;

operate the first plurality of coupling modules in the first string to connect a first predetermined number of the first plurality of energy storage modules in the first string in series to generate an output at a first voltage level and disconnect a second predetermined number of the first plurality of the energy storage modules in the first string, the first predetermined number of the first plurality of energy storage modules having identified ages that are less than any identified age in the second predetermined number of the first plurality of energy storage modules; and operate the second plurality of coupling modules in the second string to connect the first predetermined number of the second plurality of energy storage modules in the second string in series to generate another output at the first voltage level and disconnect the second predetermined number of the second plurality of the energy storage modules in the second string, the first predetermined number of the second plurality of energy storage modules having identified ages that are less than any identified age in the second predetermined number of the second plurality of energy storage modules.

2. The energy storage device as claimed in claim 1, the control device being further configured to:

update a value of the age of each energy storage module of the first plurality of energy storage modules and the second plurality of energy storage modules at predetermined time intervals in dependence upon the progression with respect to time of the operating temperature, the progression with respect to time of the power output, the progression with respect to time of the energy output, the service life without energy consumption, and the cumulative operating time of the respective energy storage module.

3. The energy storage device as claimed in claim 1, further comprising:

a first string coupling module in the first string that is coupled between the first plurality of energy storage modules and the output connector, the first string coupling module being configured to connect the first string to the output connector in a first mode and disconnect the first string from the output connector in a second mode;

a second string coupling module in the second string that is coupled between the second plurality of energy storage modules and the output connector, the second string coupling module being configured to connect the second string to the output connector in a first mode and disconnect the second string from the output connector in a second mode;

a third string comprising a third plurality of energy storage modules connected in series and a third string coupling module, each energy storage module in the first plurality of energy storage modules including at least one energy cell and the third string coupling module being configured to connect the third string to the output connector in a first mode and disconnect the second string from the output connector in a second mode;

the control device being operatively connected to the first string coupling module and the second string coupling module, the control device being further configured to:

identify a first total age of the first plurality of energy storage modules in the first string;

identify a second total age of the first plurality of energy storage modules in the second string;

identify a third total age of the first plurality of energy storage modules in the third string;

identify two active strings from the first, second, and third strings with a minimum difference in total age between the two strings and identify an inactive string with a difference from each of the two active strings that exceeds the minimum difference;

operate the corresponding string coupling modules in the two active strings in the first mode to connect the two active strings to the output connector; and operate the corresponding string coupling module in the inactive string in the second mode to disconnect the inactive string from the output connector.

4. A power supply system, comprising:

an energy storage device connected to an AC converter and configured to generate a supply voltage for the AC converter to generate an output for a load, the energy storage device including:

an output connector, a first string comprising a first plurality of energy storage modules connected in series and a first plurality of coupling modules, each energy storage module in the first plurality of energy storage modules including at least one energy cell and each coupling module including at least one switching device configured to connect a corresponding energy storage module in the first plurality of energy storage modules in series with the first string in a first mode and bridge the corresponding energy storage module to isolate the corresponding energy storage module from the first string in a second mode;

a second string connected in parallel with the first string, the second string comprising a second plurality of energy storage modules connected in series and a second plurality of coupling modules, each energy storage module in the second plurality of energy storage modules including at least one energy cell and each coupling module including at least one switching device configured to connect a corresponding energy storage module in the second plurality of energy storage modules in series with the second string in the first mode and bridge the corresponding energy storage module to isolate the corresponding energy storage module from the second string in the second mode; and a control device connected to the first plurality of coupling modules in the first string and the second plurality of coupling modules in the second string, the control device being configured to:

identify an age of each energy storage module in the first plurality of energy storage modules and the second plurality of storage modules with reference to an operating temperature, a progression with respect to time of a power output, a progression with respect to time of an energy output, a service life without energy consumption, and a cumulative operating time of each energy storage module;

operate the first plurality of coupling modules in the first string to connect a first predetermined number of the first plurality of energy storage modules in the first string in series to generate an output at a first voltage level and disconnect a second predetermined number of the first plurality of the energy storage modules in the first string, the first predetermined number of the first plurality of energy storage modules having identified ages with a maximum age difference that is less than another age difference of the identified age of any energy storage module in the second predetermined number of the first plurality of energy storage modules; and operate the second plurality of coupling modules in the second string to connect the first predetermined number of the second plurality of energy storage modules in the second string in series to generate another output at the first voltage level and disconnect the second predetermined number of the second plurality of the energy storage modules in the second string, the first predetermined number of the second plurality of energy storage modules having identified ages with a maximum age difference that is less than another age difference of the identified age of any energy storage module in the second predetermined number of the second plurality of energy storage modules.

5. A method for operating an energy storage device comprising:

identifying with a control device a predetermined number of energy storage modules in each of a first string and a second string of energy storage modules required to drive a load connected to the energy storage device with reference to a prevailing load requirement for the load, the first string comprising a first plurality of the energy storage modules connected in series and the second string comprising a second plurality of the energy storage modules connected in series, the first string and the second string being connected in parallel;

identifying with the control device an age of each energy storage module in the first plurality of energy storage modules in the first string and an age of each energy storage module in the second plurality of energy storage modules in the second string with reference to an operating temperature, a progression with respect to time of a power output, a progression with respect to time of an energy output, a service life without energy consumption, and a cumulative operating time of each energy storage module;

operating, with the control device, a first plurality of coupling devices in the first string in a first mode to connect the predetermined number of energy storage modules in the first string to the load and a second plurality of coupling devices in the first string in a second mode to bypass any energy storage module in the first plurality of energy storage modules that is not in the predetermined number of energy storage modules, each energy storage module in the predetermined number of energy storage modules in the first string having an age that is less than an age of any of the first plurality of energy storage modules that is not in the predetermined number of energy storage modules; and operating with the control device a first plurality of coupling devices in the second string in the first mode to connect the predetermined number of energy storage modules in the second string to the load and a second plurality of coupling devices in the second string in the second mode to bypass any energy storage module in the second plurality of energy storage modules that is not in the predetermined number of energy storage modules, each energy storage module in the predetermined number of energy storage modules in the second string having an age that is less than an age of any of the second plurality of energy storage modules that is not in the predetermined number of energy storage modules.

6. The method as claimed in claim 5, the identification of the age of each energy storage module in the first plurality of energy storage modules and the second plurality of energy storage modules further comprising:

updating, with the controller device, a plurality of previously generated parameters corresponding to previously identified operating temperature, progression with respect to time of a power output, progression with respect to time of an energy output, service life without energy consumption, and cumulative operating time parameters of each energy storage module.

7. The method as claimed in claim 5, wherein the energy storage device is operated in a charging operation, in a discharging operation, or in a discharging/charging operation.

* * * * *